United States Patent
Ohno

(10) Patent No.: US 11,472,315 B2
(45) Date of Patent: Oct. 18, 2022

(54) CHILD SEAT TEMPORARY HOLDING STRUCTURE IN PASSENGER MOTOR VEHICLE

(71) Applicant: Toyota Jidosha Kabushiki Kaisha, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/007,834

(22) Filed: Aug. 31, 2020

(65) Prior Publication Data
US 2021/0101507 A1   Apr. 8, 2021

(30) Foreign Application Priority Data
Oct. 4, 2019  (JP) .............................. JP2019-184083

(51) Int. Cl.
*B60N 2/28* (2006.01)
*B60N 2/005* (2006.01)

(52) U.S. Cl.
CPC ............... *B60N 2/28* (2013.01); *B60N 2/005* (2013.01)

(58) Field of Classification Search
CPC . B60N 2/01; B60N 2/305; B60N 2/24; B60N 2/3011; B60N 2/36; B60N 2/06; B60N 2/062; B60N 2205/35
USPC ...... 296/64, 65.01, 65.05, 24.34, 75, 70, 19, 296/193.07; 297/216.1, 410, 396, 452.18, 297/188.14, 391, 129, 135
See application file for complete search history.

(56) References Cited

U.S. PATENT DOCUMENTS

| | | | |
|---|---|---|---|
| 4,615,560 A * | 10/1986 | Schaller .................. | A47D 1/10 297/130 |
| 5,590,927 A * | 1/1997 | Rapphahn ................ | A47D 1/10 297/14 |
| 6,120,093 A * | 9/2000 | Gyllenspetz ............. | B60N 2/26 297/250.1 |
| 6,474,732 B1 | 11/2002 | Merensky | |
| 7,530,635 B2 * | 5/2009 | Schramek-Flye .... | B60N 2/2863 297/254 |
| 2009/0256405 A1 * | 10/2009 | Peter .................... | B60N 2/3084 297/216.19 |
| 2015/0130235 A1 * | 5/2015 | Herut ...................... | B60N 2/26 297/238 |

FOREIGN PATENT DOCUMENTS

| | | |
|---|---|---|
| JP | H532095 U | 4/1993 |
| JP | H574976 U | 10/1993 |
| JP | 2001-088796 A | 4/2001 |
| JP | 2002-046517 A | 2/2002 |
| JP | 2002-225602 A | 8/2002 |
| JP | 2011-508703 A | 3/2011 |
| WO | 2009086579 A1 | 7/2009 |

* cited by examiner

*Primary Examiner* — D Glenn Dayoan
*Assistant Examiner* — Sunsurraye Westbrook
(74) *Attorney, Agent, or Firm* — Dinsmore & Shohl LLP

(57) ABSTRACT

A child seat temporary holding structure in a passenger motor vehicle having a connection member to which a connector provided on an ISOFIX type child seat is to be detachably connected, the connection member protruding from a top wall located on the upper side of the vehicle body relative to a seat in the cabin of the passenger motor vehicle.

19 Claims, 13 Drawing Sheets

FIG. 5
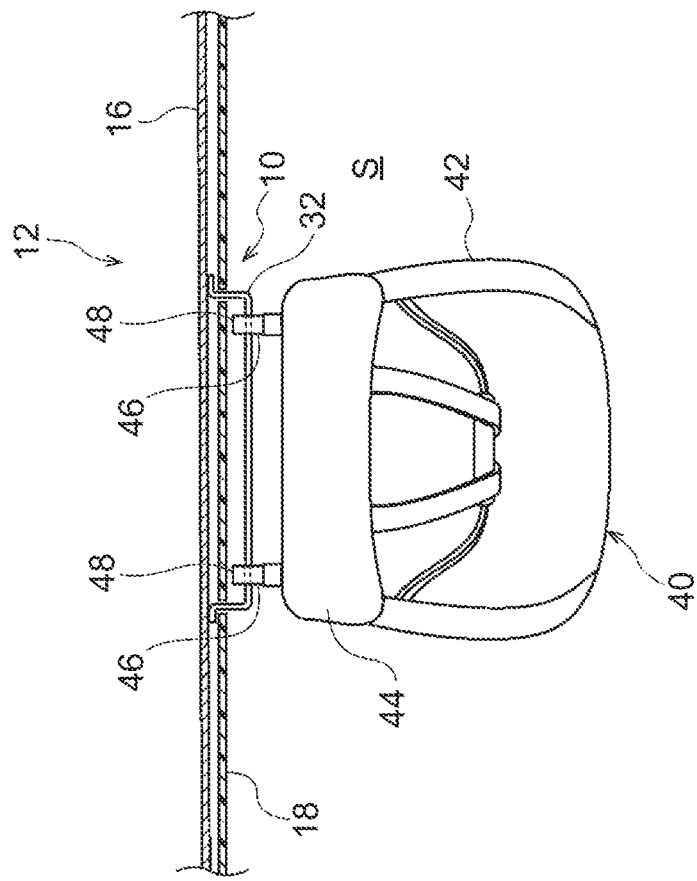
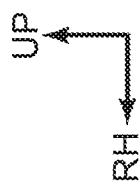

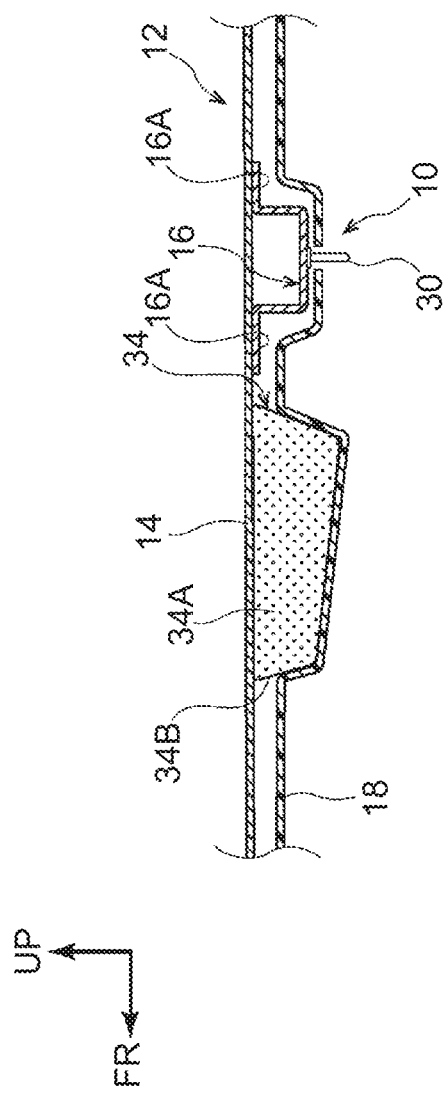
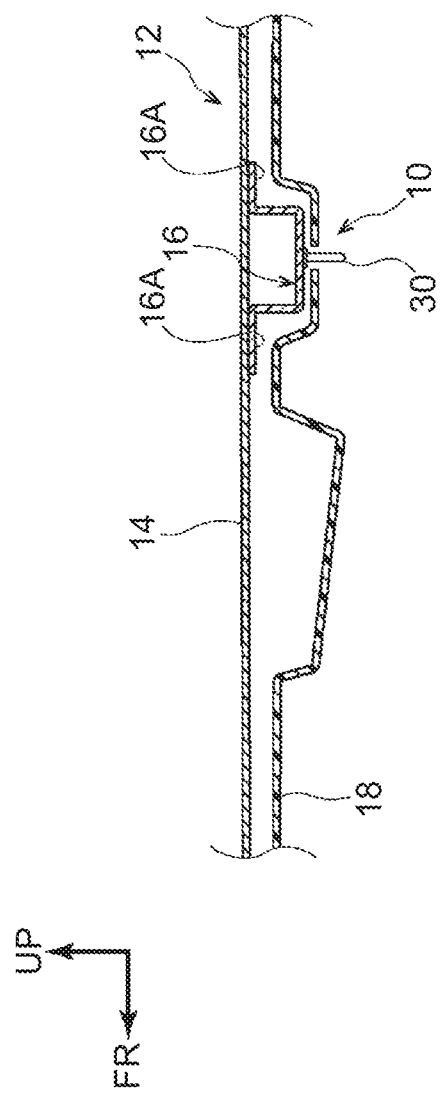

CHILD SEAT TEMPORARY HOLDING STRUCTURE IN PASSENGER MOTOR VEHICLE

CROSS-REFERENCE TO RELATED APPLICATIONS

This application claims priority to Japanese Patent Application No. 2019-184083 filed on Oct. 4, 2019, which is incorporated herein by reference in its entirety including the specification, drawings and abstract.

BACKGROUND

1. Technical Field

The present disclosure relates to a child seat temporary holding structure in a passenger motor vehicle.

2. Description of Related Art

There is conventionally known a structure that enables attaching an ISOFIX type child seat to a seat by locking a pair of left and right connectors provided on the child seat to a pair of left and right metal anchors fixed to a vehicle (see, for example, Japanese Patent Application Publication No. 2002-225602).

SUMMARY

By the way, a child seat cannot be kept attached to a seat in a passenger motor vehicle on which an unspecified large number of people ride, such as a bus. In other words, when a toddler or an infant who needs a child seat is not on the vehicle, the child seat needs to be detached from the seat and stored.

Here, in the bus (passenger motor vehicle), a relatively large space exists in the vicinity of the ceiling above the seat. Therefore, it is conceivable to store the child seat by setting a rack or the like for temporarily placing the child seat thereon in the vicinity of the ceiling.

However, if the child seat is temporarily placed and stored on the rack set in the vicinity of the ceiling above the seat, there is a concern that the child seat may fall from the rack due to vibrations when the bus is moving. Further, in an autonomous bus without a staff member on board, a child seat needs to be easily attached to and detached from a seat by an ordinary passenger.

Therefore, the purpose of the present disclosure is to provide a child seat temporary holding structure in a passenger motor vehicle that enables a child seat, which is easily attachable to and detachable from a seat by an ordinary passenger, to be stored in the vicinity of the ceiling on the upper side of a vehicle body relative to the seat, without a concern that the child seat may fall.

In order to achieve the purpose, a child seat temporary holding structure in a passenger motor vehicle according to claim 1 of the present disclosure has a connection member to which a connector provided on an ISOFIX type child seat is to be detachably connected, the connection member protruding from a top wall located on the upper side of the vehicle body relative to a seat in the cabin of the passenger motor vehicle.

According to the disclosure of a first aspect, the connection member to which the connector provided on the ISOFIX type child seat is to be detachably connected protrudes from the top wall located on the upper side of the vehicle body relative to the seat in the cabin of the passenger motor vehicle. Thus, by connecting the connector to the connection member, it is possible to store the child seat in the vicinity of the ceiling on the upper side of the vehicle body relative to the seat, without a concern that the child seat may fall. Moreover, since the child seat is of ISOFIX type, even an ordinary passenger can easily attach and detach the child seat to and from the seat.

A child seat temporary holding structure in a passenger motor vehicle according to a second aspect is the child seat temporary holding structure in the passenger motor vehicle according to the first aspect, wherein the connection member may protrude in such a direction as to allow connection of the connector to the connection member from the lower side of the vehicle body.

According to the disclosure of the second aspect, the connection member may protrude in such a direction as to allow connection of the connector of the child seat to the connection member from the lower side of the vehicle body. Thus, even an ordinary passenger can easily attach and detach the connector of the child seat to and from the connection member.

A child seat temporary holding structure in a passenger motor vehicle according to a third aspect is the child seat temporary holding structure in the passenger motor vehicle according to the second aspect, wherein a cushion member may be provided between a seat back of the child seat and the top wall.

According to the disclosure of the third aspect, the cushion member may be provided between the seat back of the child seat and the top wall. Thus, the cushion member reduces shaking of the child seat due to vibrations when the passenger motor vehicle is moving, and reduces generation of noise due to the shaking.

A child seat temporary holding structure in a passenger motor vehicle according to a fourth aspect of the present disclosure has a connection member to which a connector provided on an ISOFIX type child seat is to be detachably connected, the connection member protruding from a rear wall adjacent to a top wall located on the upper side of a vehicle body relative to a seat in the cabin of the passenger motor vehicle.

According to the disclosure of the fourth aspect, the connection member to which the connector provided on the ISOFIX type child seat is to be detachably connected protrudes from the rear wall adjacent to the top wall located on the upper side of the vehicle body relative to the seat in the cabin of the passenger motor vehicle. Thus, by connecting the connector to the connection member, it is possible to store the child seat in the vicinity of the ceiling on the upper side of the vehicle body relative to the seat and on the rear side of the vehicle body, without a concern that the child seat may fall. Moreover, since the child seat is of ISOFIX type, even an ordinary passenger can easily attach and detach the child seat to and from the seat.

A child seat temporary holding structure in a passenger motor vehicle according to a fifth aspect is the child seat temporary holding structure in the passenger motor vehicle according to the fourth aspect, wherein the connection member may protrude in such a direction as to allow connection of the connector to the connection member from the front side of the vehicle body.

According to the disclosure of the fifth aspect, the connection member may protrude in such a direction as to allow connection of the connector of the child seat to the connection member from the front side of the vehicle body. Thus, even an ordinary passenger can easily attach and detach the connector of the child seat to and from the connection member. Moreover, the concern that the child seat may fall is further reduced.

A child seat temporary holding structure in a passenger motor vehicle according to a sixth aspect is the child seat temporary holding structure in the passenger motor vehicle according to the fifth aspect, wherein a cushion member may be provided between a seat back of the child seat and the rear wall.

According to the disclosure of the sixth aspect, the cushion member may be provided between the seat back of the child seat and the rear wall. Thus, the cushion member reduces shaking of the child seat due to vibrations when the passenger motor vehicle is moving, and reduces generation of noise due to the shaking.

A child seat temporary holding structure in a passenger motor vehicle according to a seventh aspect of the present disclosure has a connection member to which a connector provided on an ISOFIX type child seat is to be detachably connected, the connection member protruding from a side wall adjacent to a top wall located on the upper side of the vehicle body relative to a seat in the cabin of the passenger motor vehicle.

According to the disclosure of the seventh aspect, the connection member to which the connector provided on the ISOFIX type child seat is to be detachably connected protrudes from the side wall adjacent to the top wall located on the upper side of the vehicle body relative to the seat in the cabin of the passenger motor vehicle. Thus, by connecting the connector to the connection member, it is possible to store the child seat in the vicinity of the ceiling on the upper side of the vehicle body relative to the seat and on an outer side in the vehicle width direction, without a concern that the child seat may fall. Moreover, since the child seat is of ISOFIX type, even an ordinary passenger can easily attach and detach the child seat to and from the seat.

A child seat temporary holding structure in a passenger motor vehicle according to an eighth aspect is the child seat temporary holding structure in the passenger motor vehicle according to the seventh aspect, wherein the connection member may protrude in such a direction as to allow connection of the connector to the connection member from an inner side in the vehicle width direction.

According to the disclosure of the eighth aspect, the connection member may protrude in such a direction as to allow connection of the connector of the child seat to the connection member from the inner side in the vehicle width direction. Thus, even an ordinary passenger can easily attach and detach the connector of the child seat to and from the connection member. Moreover, the concern that the child seat may fall is further reduced.

A child seat temporary holding structure in a passenger motor vehicle according to a ninth aspect is the child seat temporary holding structure in the passenger motor vehicle according to the eighth aspect, wherein a cushion member may be provided between a seat back of the child seat and the side wall.

According to the disclosure of the ninth aspect, the cushion member may be provided between the seat back of the child seat and the side wall. Thus, the cushion member reduces shaking of the child seat due to vibrations when the passenger motor vehicle is moving, and reduces generation of noise due to the shaking.

A child seat temporary holding structure in a passenger motor vehicle according to claim a tenth aspect is the child seat temporary holding structure in the passenger motor vehicle according to any one of the fourth to the ninth aspects, and may have a support base of soft material for supporting a seat cushion of the child seat from the lower side of the vehicle body.

According to the disclosure of tenth aspect, the support base of soft material for supporting the seat cushion of the child seat from the lower side of the vehicle body may be provided. Thus, the concern that the child seat may fall is eliminated, and it is possible to prevent the head of a passenger sitting on the seat from hitting the child seat.

A child seat temporary holding structure in a passenger motor vehicle according to an eleventh aspect is the child seat temporary holding structure in the passenger motor vehicle according to any one of the fourth to ninth aspects, wherein the child seat may be held in an upside-down state and the connector is connected to the connection member.

According to the disclosure of the eleventh aspect, the child seat may be held in the upside-down state, and the connector is connected to the connection member. Thus, it is possible to reduce the protrusion of the child seat toward the seat and to reduce the occasion where a passenger sitting on the seat feels that the child seat is bothersome.

A child seat temporary holding structure in a passenger motor vehicle according to a twelfth aspect is the child seat temporary holding structure in the passenger motor vehicle according to the third, sixth, or ninthe aspect, wherein the cushion member may be attached to the seat back of the child seat.

According to the disclosure of the twelfth aspect, the cushion member may be attached to the seat back of the child seat. Thus, the cabin of the passenger motor vehicle is simplified compared to the configurations in which the cushion member is attached to the top wall, the rear wall, or the side wall of the passenger motor vehicle.

A child seat temporary holding structure in a passenger motor vehicle according to a thirteenth aspect is the child seat temporary holding structure in the passenger motor vehicle according to any one of the first to twelfth aspects, wherein the connection member may be formed of one rod extending in the width direction of the child seat.

According to the disclosure of the thirteenth aspect, the connection member may be formed of one rod extending in the width direction of the child seat. Thus, the configuration of the connection member is simplified, and the connectability of the connector to the connection member is improved.

As described above, according to the present disclosure, in the passenger motor vehicle, a child seat which even an ordinary passenger can easily attach to and detach from a seat can be stored in the vicinity of the ceiling on the upper side of the vehicle body relative to the seat, without a concern that the child seat may fall.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is an enlarged front view showing a modified example of an anchor constituting the child seat temporary holding structure according to the first embodiment;

FIG. 6A is an enlarged side view showing a first modified example of a cushion member constituting the child seat temporary holding structure according to the first embodiment;

FIG. 6B is an enlarged side view showing a second modified example of the cushion member constituting the child seat temporary holding structure according to the first embodiment;

DETAILED DESCRIPTION OF EMBODIMENTS

Hereinafter, embodiments according to the present disclosure will be described in detail based on the drawings. For convenience of description, in each of the drawings, an arrow UP indicates an upward direction of a vehicle body, an arrow FR indicates a front direction of the vehicle body, and an arrow RH indicates a right direction of the vehicle body. Therefore, in the following description, when the up and down, front and rear, and left and right directions are stated without any special mention, these directions indicate up and down in the up-down direction of the vehicle body, front and rear in the front-rear direction of the vehicle body, and left and right in the left-right direction of the vehicle body (the vehicle width direction). For child seats 40, 50 described later, front and rear, left and right, and up and down are expressed based on the state of use of the child seats 40, 50.

Figure 1:
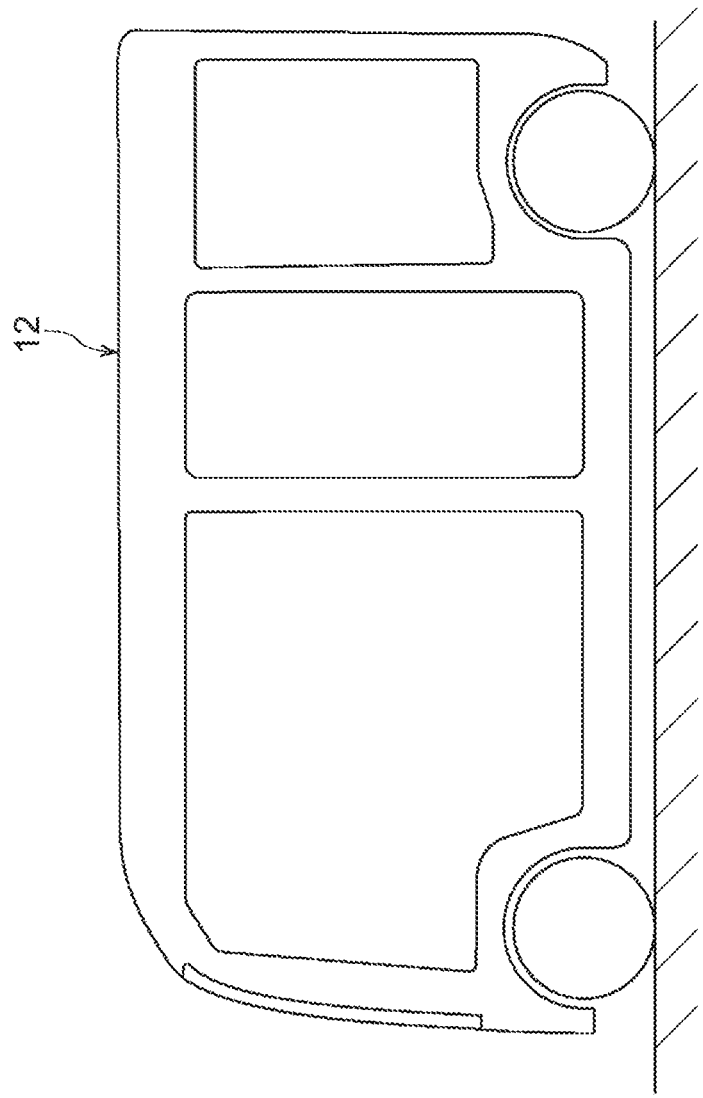
FIG. 1 is a side view showing an external appearance of a bus provided with a child seat temporary holding structure according to the present embodiment.

A child seat temporary holding structure 10 (see FIG. 2) according to the present embodiment is applied to a small-size bus 12 or the like as shown in FIG. 1. More specifically, for example, in a large-size bus (not shown) or the like having, between front and rear wheels, a luggage compartment for storing luggage from the outside of the vehicle, the child seat 40 can be placed in the luggage compartment or the like. Therefore, it is not necessary to provide the child seat temporary holding structure 10 in the cabin of the large-size bus or the like.

Figure 2:
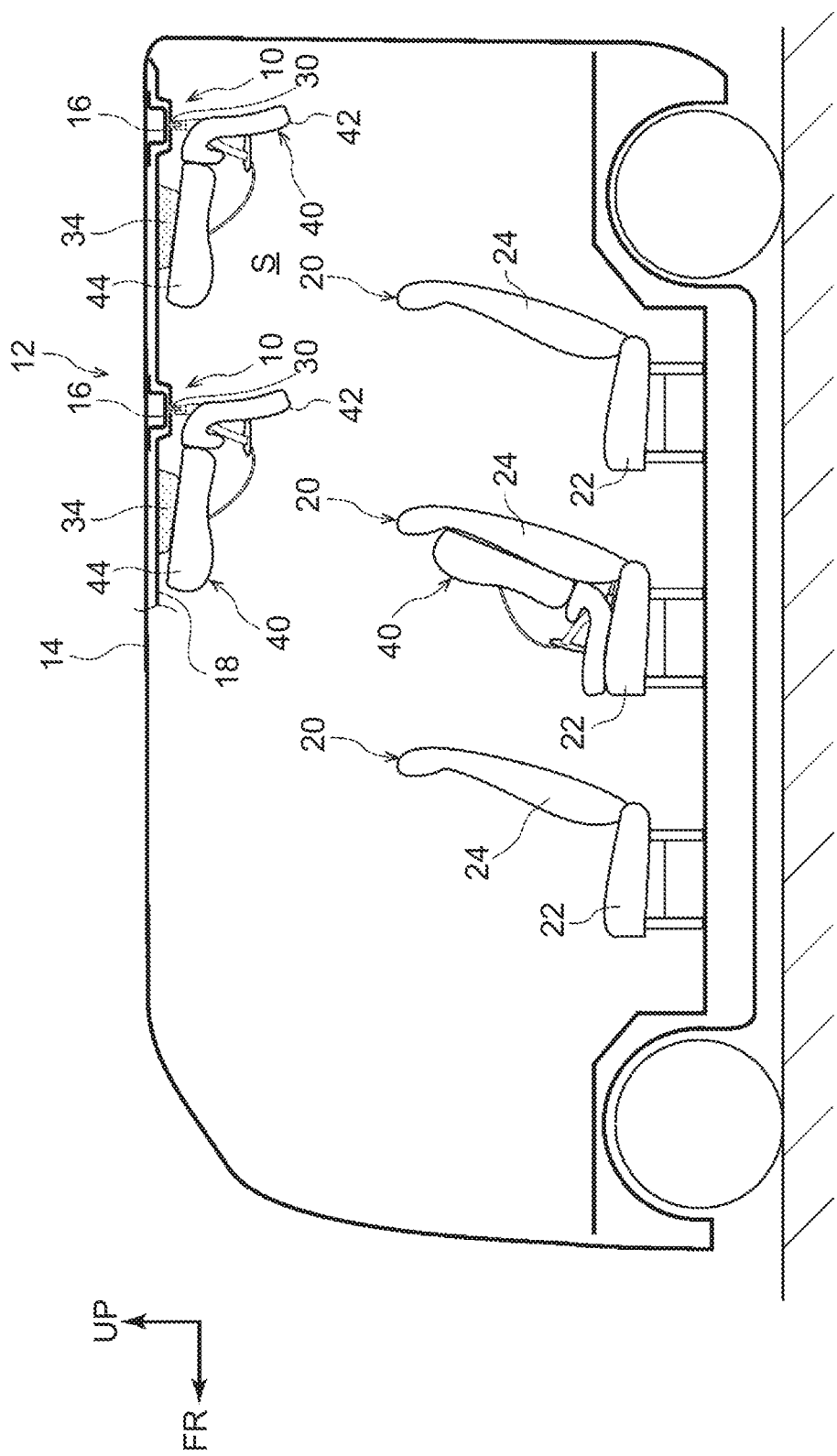
FIG. 2 is a side view showing a cabin of a bus provided with a child seat temporary holding structure according to a first embodiment.

In other words, as shown in FIG. 2, the child seat temporary holding structure 10 according to the present embodiment is suitably applied to the small-size bus 12 or the like that has a space for the child seats 40 only in the vicinity of the ceiling above seats 20 provided in the cabin for passengers to sit on. Hence, hereinafter, the small-size bus 12 (including a route bus or the like) driven by a staff member is taken as an example of a passenger motor vehicle, and the child seat temporary holding structure 10 according to the present embodiment is described.

First Embodiment

Figure 3:
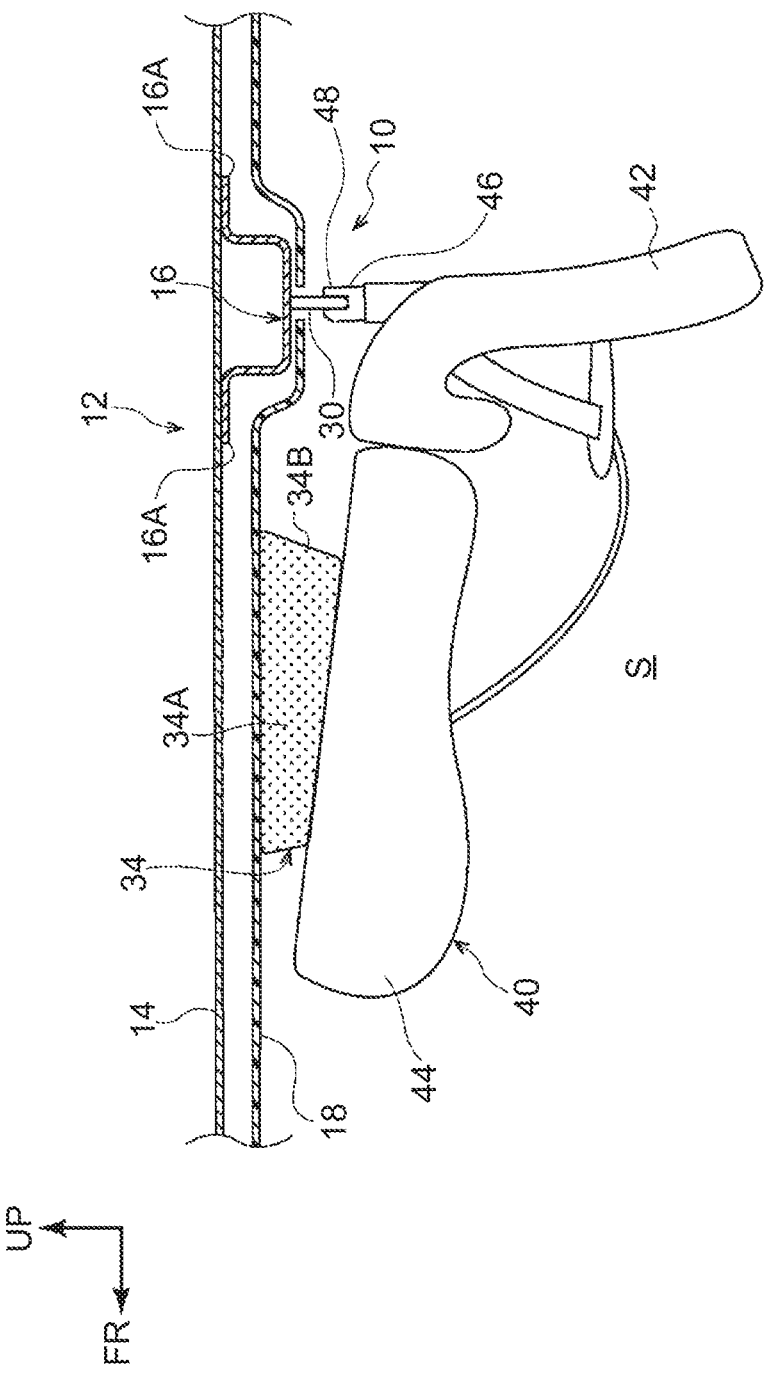
FIG. 3 is an enlarged side view showing the child seat temporary holding structure according to the first embodiment.

First, the first embodiment will be described. As shown in FIGS. 2 and 3, a relatively wide dead space S exists in the vicinity of the ceiling, that is, around a roof headlining 18 as a ceiling wall, on the rear side in the cabin of the bus 12 and above the seats 20. Therefore, each child seat temporary holding structure 10 is configured to store the child seat 40 in the dead space S.

More specifically, on a lower surface of a roof panel 14 made of metal constituting the roof of the bus 12, a plurality of roof reinforcements 16 made of metal extending in the vehicle width direction are provided at intervals in the front-rear direction. Each roof reinforcement 16 is formed in a substantially hat shape in a side view seen from the vehicle width direction, and each of flange portions 16A in front and rear of the roof reinforcement 16 is joined to the lower surface of the roof panel 14 by welding or the like.

A pair of left and right anchors 30 as connection members to which connectors 46 described later are to be detachably connected, respectively, are attached, with a space therebetween in the vehicle width direction, to the lower surface of each of two roof reinforcements 16 located on the rear side among the plurality of roof reinforcements 16.

In other words, a pair of left and right anchors 30 are attached to both sides of the roof reinforcement 16 in the vehicle width direction, respectively, located above a plurality of seats 20 installed on both left and right sides in the cabin of the bus 12. Thus, a total of four child seats 40, two each on the left and the right, can be temporarily held (stored) in the cabin of the bus 12.

Figure 4:
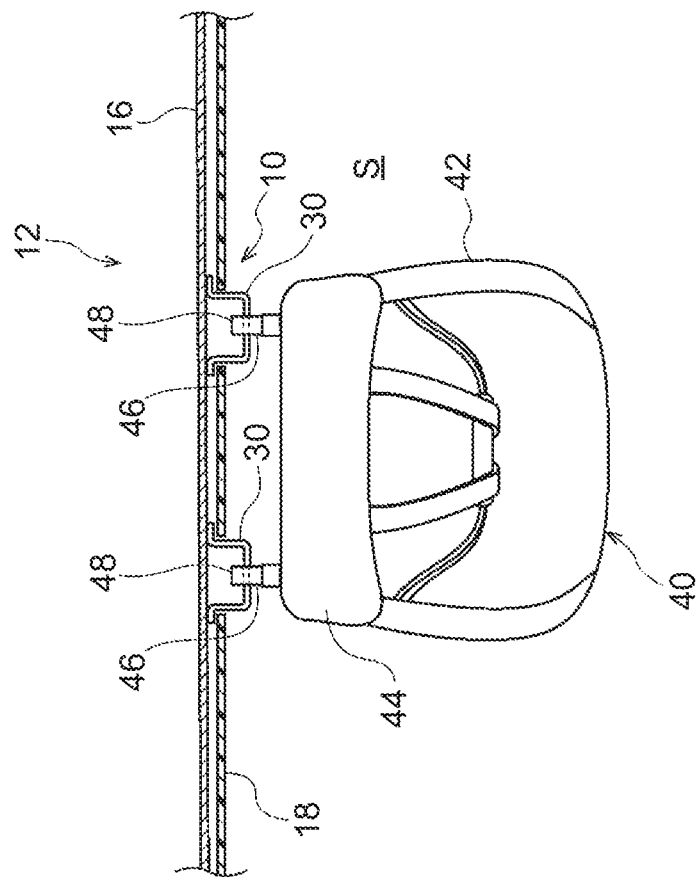
FIG. 4 is an enlarged front view showing the child seat temporary holding structure according to the first embodiment.

As shown in FIGS. 3 and 4, each anchor 30 is formed by bending a cylindrical metal rod into a substantially hat shape in a front view seen from the front-rear direction, and both end portions are joined to the lower surface of the roof reinforcement 16 by welding or the like. A central portion of each anchor 30 protrudes from the roof headlining 18 toward the inside (lower side) of the vehicle.

As shown in FIG. 4, the distance between the pair of left and right anchors 30 in the vehicle width direction is substantially the same as the distance between a pair of left and right connectors 46 provided on an ISOFIX type child seat 40 such that the connectors 46 can be detachably attached. The ISOFIX type child seat 40 and the connectors 46 will be described in detail later.

As shown in FIG. 3, a cushion member 34 is provided on the roof headlining 18, on the front side relative to the anchor 30. The cushion member 34 is composed of, for example, a urethane foam 34A and a surfacing material 34B covering the urethane foam 34A, and the upper surface of the surfacing material 34B is attached to the roof headlining 18 with adhesive such as a double-sided tape.

When the child seat 40 is secured to the anchors 30, the back surface of a seat back 44 of the child seat 40 is brought into contact with the lower surface of the cushion member 34 (surfacing material 34B) from below by a predetermined pressure. In other words, the cushion member 34 is elastically deformed by the seat back 44 of the child seat 40.

The child seat 40 is of the ISOFIX type, and the pair of left and right connectors 46 are configured to be able to protrude from the rear end portion of a seat cushion 42 toward the rear side of the seat cushion 42. In short, each connector 46 is configured to be slidable in the front-rear direction with respect to the seat cushion 42.

The connector 46 has a tip portion 48 formed in a bifurcated shape separated into upper and lower parts (the upper and lower parts in the use state when the child seat 40 is attached to the seat 20), and is configured to be attached to the anchor 30 by holding the central portion of the anchor 30 from above and below.

Therefore, when securing the child seat 40 to the anchors 30, the anchors 30 are relatively inserted into the tip portions 48 of the connectors 46. Consequently, the connectors 46 are attached to the anchors 30. Thereafter, the child seat 40 is pushed toward the anchors 30. Then, the connectors 46 are relatively slid toward the front side of the seat cushion 42, and the child seat 40 is secured to the anchors 30.

When detaching the child seat 40 from the anchors 30, the child seat 40 can be easily detached by operating a release mechanism (not shown) provided in each connector 46. The child seat 40 detached from the anchors 30 is attached to the seat 20. In short, a pair of left and right anchors (not shown) to which the connectors 46 are to be attached are also provided between a seat cushion 22 and a seat back 24 of the seat 20.

Next, the function of the child seat temporary holding structure 10 according to the first embodiment configured as described above will be described.

When no toddler who needs the child seat 40 is on the bus 12, a total of four child seats 40 are secured to the anchors 30 constituting the child seat temporary holding structures 10, and stored and retained in the dead space S. At this time, as shown in FIG. 3, the seat back 44 of each child seat 40 is in contact with the cushion member 34 with a predetermined pressure.

Hence, it is possible to reduce or prevent shaking of the stored and retained child seats 40 due to vibrations when the bus 12 is moving, and reduce or prevent generation of noise due to the shaking.

Moreover, each child seat 40 is stored in a state in which the front surface of the seat back 44 faces downward such that the seat cushion 42 having a shorter length than the seat back 44 is positioned along the up-down direction in a side view seen from the vehicle width direction, and therefore it is possible to reduce the occasion where a passenger sitting on the seat 20 feels that the child seat 40 is bothersome.

When a toddler who needs the child seat 40 rides the bus 12, a staff member or a passenger detaches the child seat 40. Specifically, the staff member or the passenger operates the release mechanisms provided in the connectors 46, and detach the connectors 46 from the anchors 30. At this time, since the connectors 46 are of the ISOFIX type, even an ordinary passenger can easily detach the connectors 46 from the anchors 30.

The child seat 40 with connectors 46 detached from the anchors 30 is attached to the seat 20 by the staff member or the passenger. Specifically, since the seat 20 is also provided with anchors that are similar to the anchors 30 and of the ISOFIX type, even an ordinary passenger can easily and surely attach the connectors 46 to the anchors.

Thus, when the child seat 40 is attached to the seat 20, the toddler sits on the child seat 40. Consequently, it is possible to improve the safety and comfort of not only adults but also toddlers when the bus 12 is moving (it is possible to satisfy both the safety and comfort of adults and toddlers). Furthermore, since the bus 12 is always equipped with the child seats 40 as described above, a passenger does not need to bring the child seat 40 when riding the bus 12.

When the toddler gets off the bus 12 and no toddler is on the bus 12, the staff member or a passenger detaches the child seat 40 from the seat 20. Specifically, the staff member or the passenger operates the release mechanisms provided in the connectors 46, and detaches the connectors 46 from the anchors of the seat 20. At this time, since the connectors 46 are of the ISOFIX type, even an ordinary passenger can easily detach the connectors 46 from the anchors of the seat 20.

When the child seat 40 is detached from the seat 20, the child seat 40 is secured to the anchors 30 protruding from the roof headlining 18 by the staff member or the passenger. In short, the connectors 46 are attached to the anchors 30. At this time, since the anchors 30 protrude in such a direction as to allow connection of the connectors 46 to the anchors 30 from below and are of the ISOFIX type, even an ordinary passenger can easily and surely attach the connectors 46 to the anchors 30. In other words, it is possible to store the child seat 40 in the dead space S in the vicinity of the ceiling above the seats 20, without a concern that the child seat 40 may fall.

No toddler will ever sit on the child seat 40 secured to the anchors 30 constituting the child seat temporary holding structure 10 (stored in the dead space S). Therefore, the anchors 30 are required to have less strength than the anchors provided on the seat 20. Hence, the anchors 30 can be made smaller than, for example, the anchors provided on the seat 20.

The anchor 30 as the connection member is not limited to the configuration in which a pair of left and right anchors are provided as shown in FIG. 4. For example, as shown in FIG. 5, an anchor 32 formed of one metal rod extending in the width direction of the child seat 40 may be used as the connection member. Specifically, the anchor 32 having a central portion with a length equal to or longer than the distance between the connectors 46 may be used.

Accordingly, the configuration of the anchor 32 and the connection to the roof reinforcement 16 can be simplified. In the case when the staff member or a passenger attaches the connectors 46 to the anchor 32, it is not necessary to care about the positions of the connectors 46 in the vehicle width direction with respect to the anchor 32, and therefore the connectors 46 can be more easily attached (the connectivity of the connectors 46 to the anchor 32 can be improved).

Moreover, the cushion member 34 is not limited to the configuration in which the cushion member 34 is attached to the roof headlining 18 shown in FIG. 2. For example, as shown in FIG. 6A, the cushion member 34 may be attached to the lower surface of the roof panel 14 and covered by the roof headlining 18 from below.

Furthermore, as shown in FIG. 6B, the cushion member 34 may not be provided, and the roof headlining 18 may be formed into a shape protruding downward. In short, the same cushioning property as the cushion member 34 may be provided by only the roof headlining 18.

Second Embodiment

Next, the second embodiment will be described. Parts that are similar to those in the first embodiment are labelled with the same signs, and detailed descriptions (including the common functions) will be omitted as appropriate.

Figure 7:
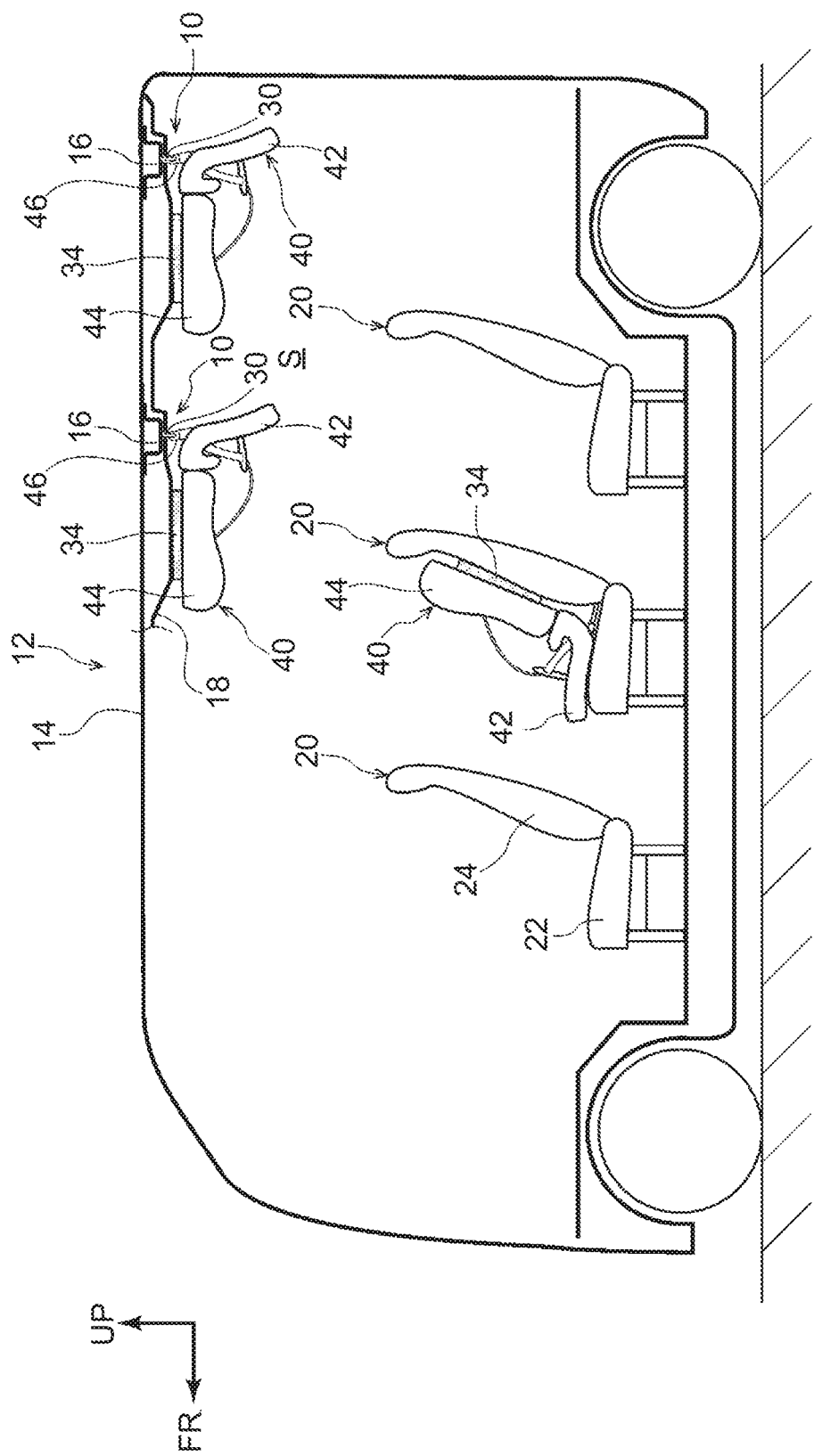
FIG. 7 is a side view showing a cabin of a bus provided with a child seat temporary holding structure according to a second embodiment.

As shown in FIG. 7, the second embodiment is different from the first embodiment only in that the cushion member 34 is attached to the back surface of the seat back 44 of the child seat 40, instead of the lower surface of the roof headlining 18. Therefore, when the child seat 40 is attached to the seat 20, the child seat 40 including the cushion member 34 is attached to the seat 20.

According to the second embodiment having such a configuration, it is not necessary to attach the cushion member 34 to the roof headlining 18 of the bus 12, and therefore the interior of the bus 12 can be simplified. The cushion member 34 in the second embodiment may be formed to be thinner than the cushion member 34 in the first embodiment, so that when the cushion member 34 is attached to the seat 20, the cushion member 34 does not get in the way.

Third Embodiment

Next, the third embodiment will be described. Parts that are similar to those in the first embodiment are labelled with the same signs, and detailed descriptions (including the common functions) will be omitted as appropriate.

Figure 8:
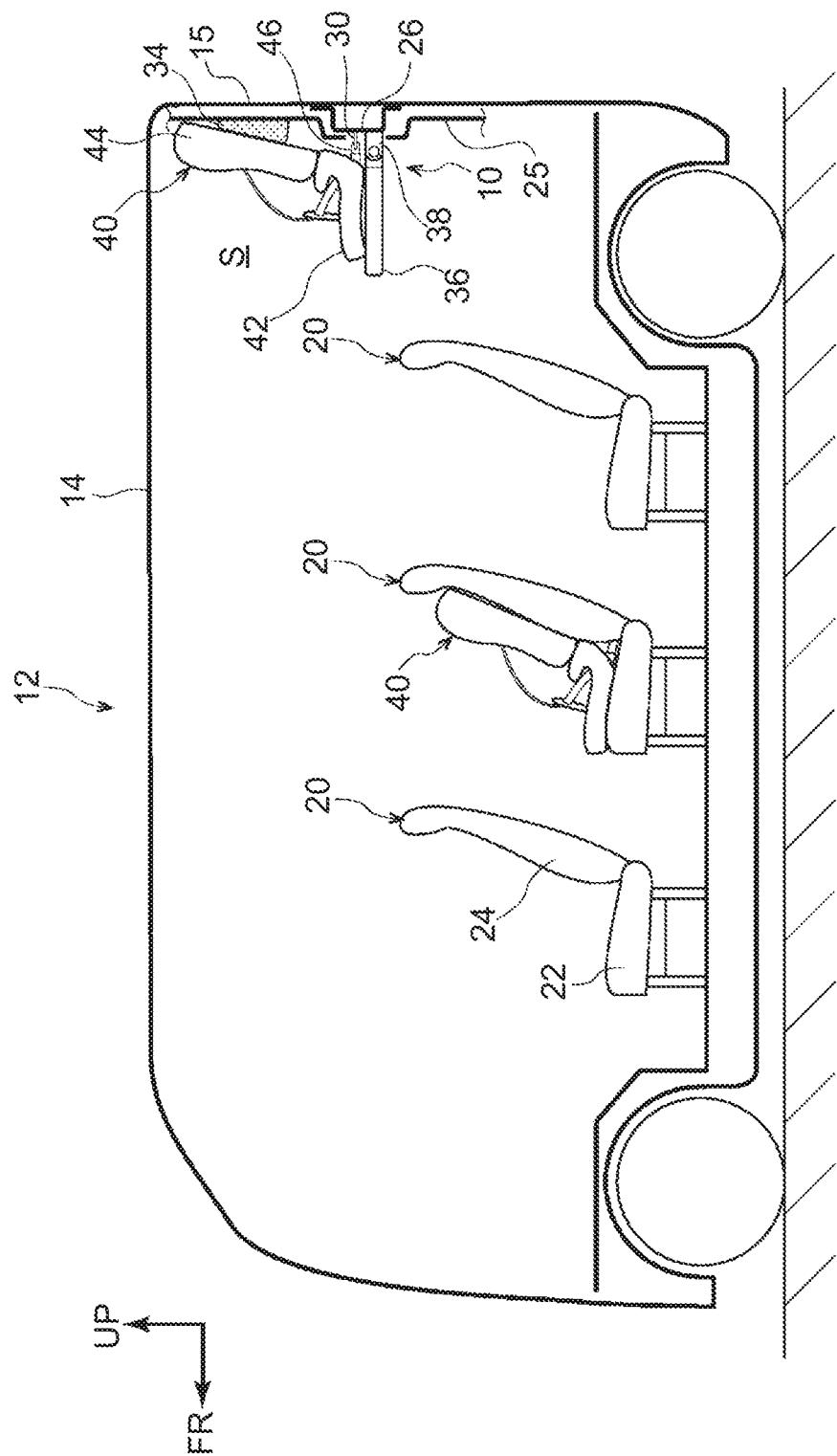
FIG. 8 is a side view showing a cabin of a bus provided with a child seat temporary holding structure according to a third embodiment.
Figure 9A:
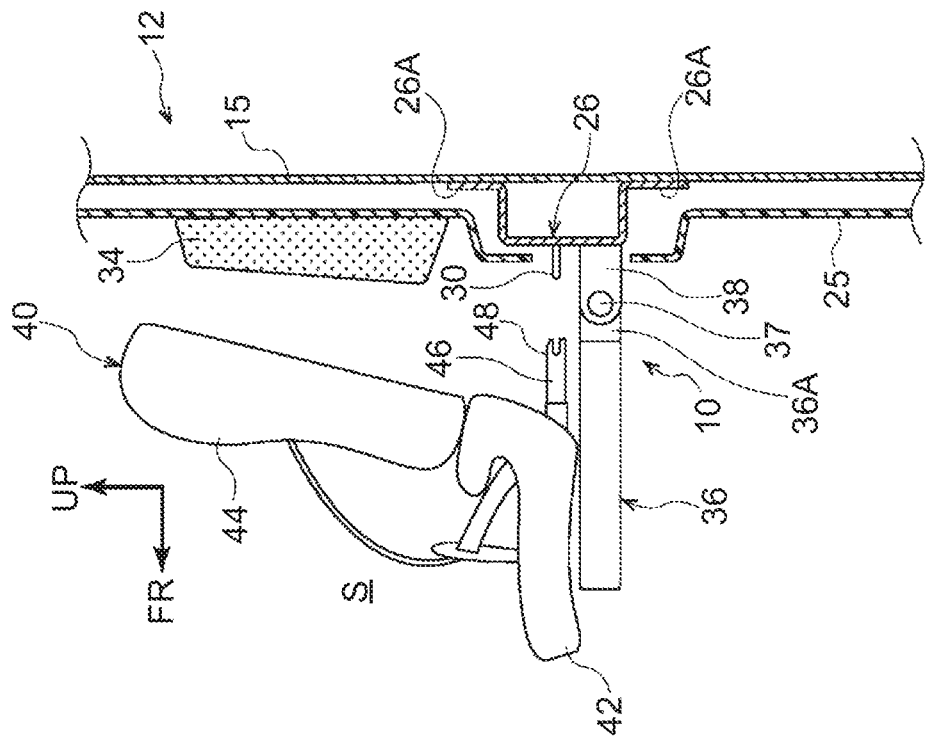
FIG. 9A is an enlarged side view showing a retracted state of a support base constituting the child seat temporary holding structure according to the third embodiment.
Figure 9B:
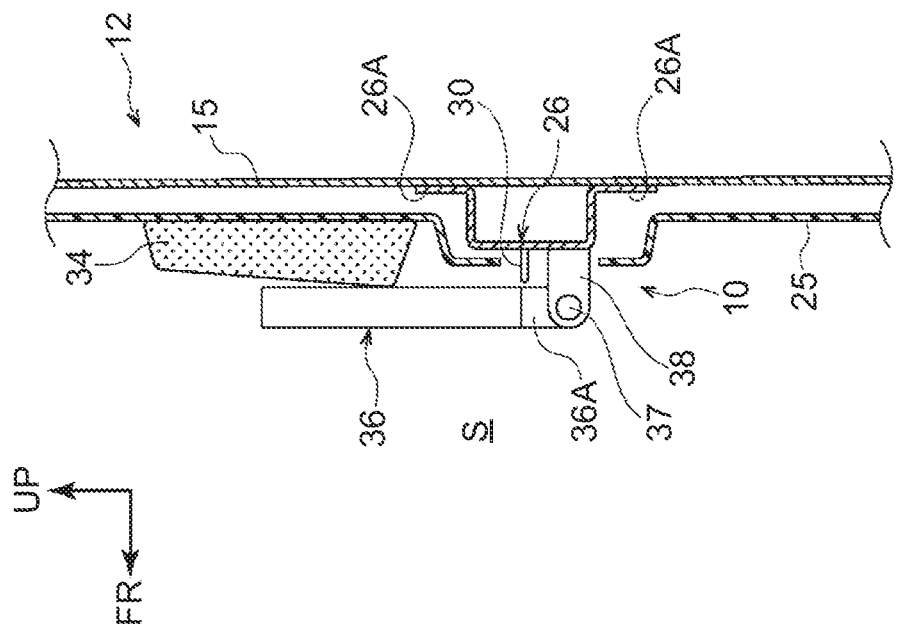
FIG. 9B is an enlarged side view showing a deployed state of the support base constituting the child seat temporary holding structure according to the third embodiment.

As shown in FIGS. 8, 9A and 9B, in the third embodiment, a pair of left and right anchors 30 are attached by welding or the like to a rear reinforcement 26 that is made of metal and provided on an upper part of a metal back panel 15 of the bus 12, instead of the roof reinforcement 16 provided on the roof panel 14 of the bus 12.

The rear reinforcement 26 extends in the vehicle width direction and is formed in a substantially hat shape in a side view seen from the vehicle width direction. Each of upper and lower flange parts 26A of the rear reinforcement 26 is joined to the front surface of the back panel 15 by welding or the like. A pair of left and right metal brackets 38 that pivotally support a later-described support base 36 are attached to the rear reinforcement 26 by welding or the like.

In other words, on the rear reinforcement 26, in the side view seen from the vehicle width direction, the anchor 30 and the bracket 38 are arranged side by side in the up-down direction, and the anchor 30 and the bracket 38 protrude from a rear wall 25 toward the inside (the front) of the vehicle. The cushion member 34 is attached to the rear wall 25 in the cabin, on the upper side of the anchor 30. The third embodiment is different from the first embodiment in the above-mentioned points.

Specifically, in the third embodiment, the child seat 40 is stored on the rear wall 25 side adjacent to the roof headlining 18 (see FIG. 2, etc.), and a total of two child seats 40, one each on the left and the right, are stored in the cabin of the bus 12. Further, in the third embodiment, the support base 36 for supporting the seat cushion 42 of the child seat 40 from below is provided.

The support base 36 is formed of a soft material, and, for example, formed of a urethane foam, a surfacing material, etc. like the cushion member 34. As shown in FIGS. 9A and 9B, the support base 36 is attached to the brackets 38 by inserting a support shaft 37 into a through-hole (not shown) formed in a rear end portion 36A of the support base 36 and through-holes (not shown) formed in the pair of left and right brackets 38 provided on the rear reinforcement 26.

The support base 36 is configured to be selectively in a retracted state in which the support base 36 is pivoted upward as shown in FIG. 9A and in a deployed state in which the support base 36 is pivoted downward as shown in FIG. 9B. Specifically, the support base 36 is configured such that the support base 36 can be retained in the retracted state by a stopper or the like (not shown) and can also be retained in the deployed state, and is configured to be pivotable about the support shaft 37 by substantially 90 degrees in the side view seen from the vehicle width direction.

Next, the function of the child seat temporary holding structure 10 according to the third embodiment configured as described above will be described.

When a toddler is on the bus 12 and the child seat 40 is attached to the seat 20, as shown in FIG. 9A, at least one support base 36 is in the retracted state. Specifically, the staff member or a passenger pivots the support base 36 upward and uses the stopper or the like to retain the support base 36. At this time, the support base 36 may be configured to be in contact with the front surface of the cushion member 34, or may be configured not to be in contact with the front surface.

The anchor 30 shown in the drawing is configured to be hidden by the support base 36 from the front side. However, when the amount of protrusion of the anchor 30 toward the front side is larger than that shown in the drawing, a hole (not shown) for passing the anchor 30 may be formed at an appropriate location on the support base 36, that is, a location the anchor 30 faces when the support base 36 is brought into the retracted state.

When no toddler is on the bus 12, the support base 36 is brought into the deployed state as shown in FIG. 9B. Specifically, the staff member or a passenger pivots the support base 36 downward and uses the stopper or the like to retain the support base 36. Then, the staff member or the passenger detaches the child seat 40 from the seat 20, and places the seat cushion 42 on the support base 36.

Next, the staff member or the passenger just pushes the child seat 40 toward the rear side and attach the connectors 46 to the anchors 30. Thus, the child seat 40 can be secured to the anchors 30, and, as shown in FIG. 8, the child seat 40 can be stored in the dead space S in the vicinity of the ceiling on the upper side and the rear side of the seats 20, without a concern that the child seat 40 may fall.

In particular, in the third embodiment, since the anchors 30 protrude in such a direction as to allow connection of the connectors 46 to the anchors 30 from the front side, even an ordinary passenger can easily and surely attach the connectors 46 to the anchors 30, and it is possible to further eliminate the concern that the child seat 40 may fall.

Furthermore, in the third embodiment, since the support base 36 for supporting the child seat 40 from below is provided, the concern that the child seat 40 may fall can be eliminated. The support base 36 can prevent the head of a passenger sitting on the seat 20 from hitting the child seat 40.

Fourth Embodiment

Next, the fourth embodiment will be described. Parts that are similar to those in the third embodiment are labelled with the same signs, and detailed descriptions (including the common functions) will be omitted as appropriate.

Figure 10:
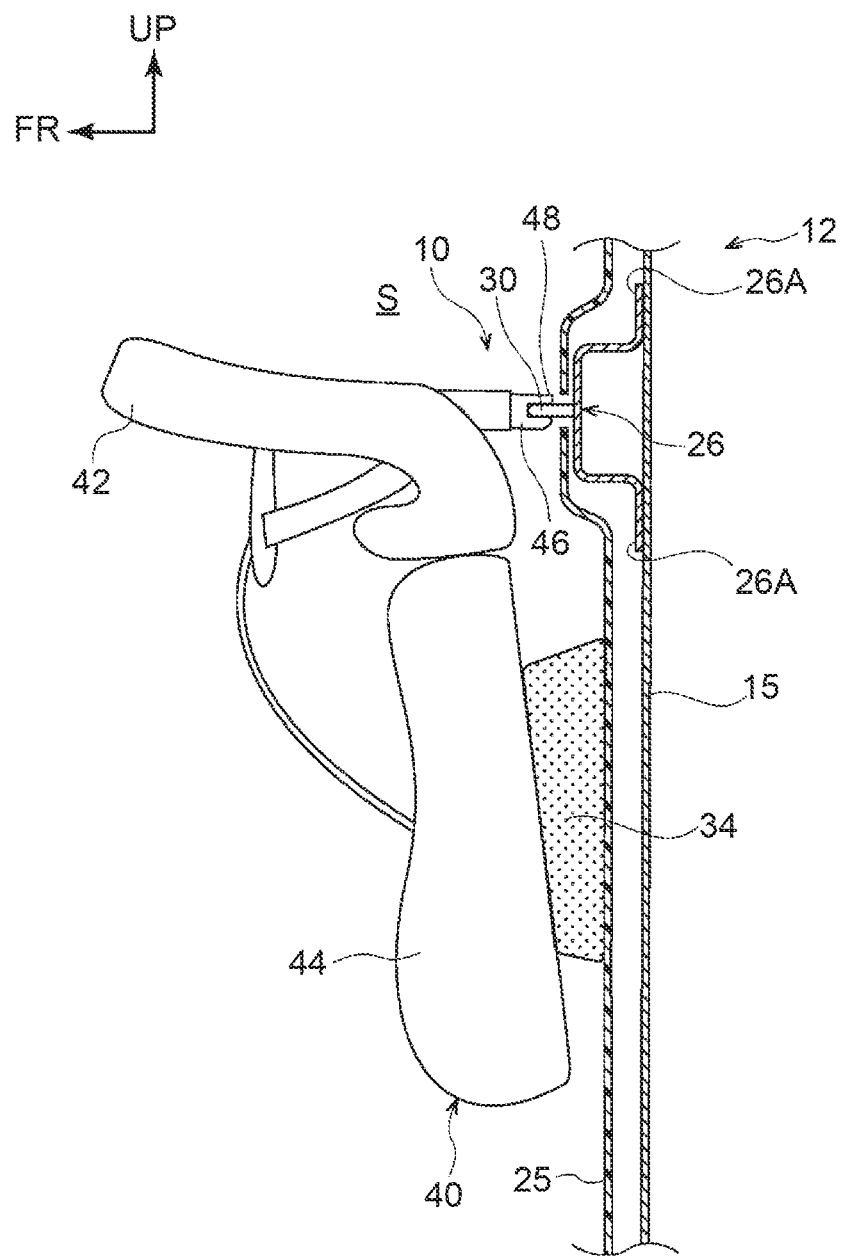
FIG. 10 is an enlarged side view showing a child seat temporary holding structure according to a fourth embodiment.

As shown in FIG. 10, the fourth embodiment is different from the third embodiment only in that there is no support base 36, the rear reinforcement 26 is disposed at a location close to the roof panel 14, and the cushion member 34 is attached to the rear wall 25 below the anchor 30. In other words, in the fourth embodiment, the child seat 40 is secured to the anchors 30 in an upside-down state in which the front surface of the seat cushion 42 faces downward and the back surface of the seat back 44 faces rearward.

According to the fourth embodiment having such a configuration, it is possible to eliminate the support base 36, and therefore the interior of the bus 12 can be simplified.

Moreover, since the child seat 40 is secured to the anchors 30 in the upside-down state as described above, it is possible to prevent the child seat 40 from protruding toward the seats 20 (the front lower side in a side view) from the dead space S in the vicinity of the ceiling on the upper side and the rear side of the seat 20. Therefore, it is possible to prevent the head of a passenger sitting on the seat 20 from hitting the child seat 40, and it is possible to reduce the occasion where the passenger sitting on the seat 20 feels that the child seat 40 is bothersome.

Fifth Embodiment

Next, the fifth embodiment will be described. Parts that are similar to those in the third embodiment are labelled with the same signs, and detailed descriptions (including the common functions) will be omitted as appropriate.

Figure 11:
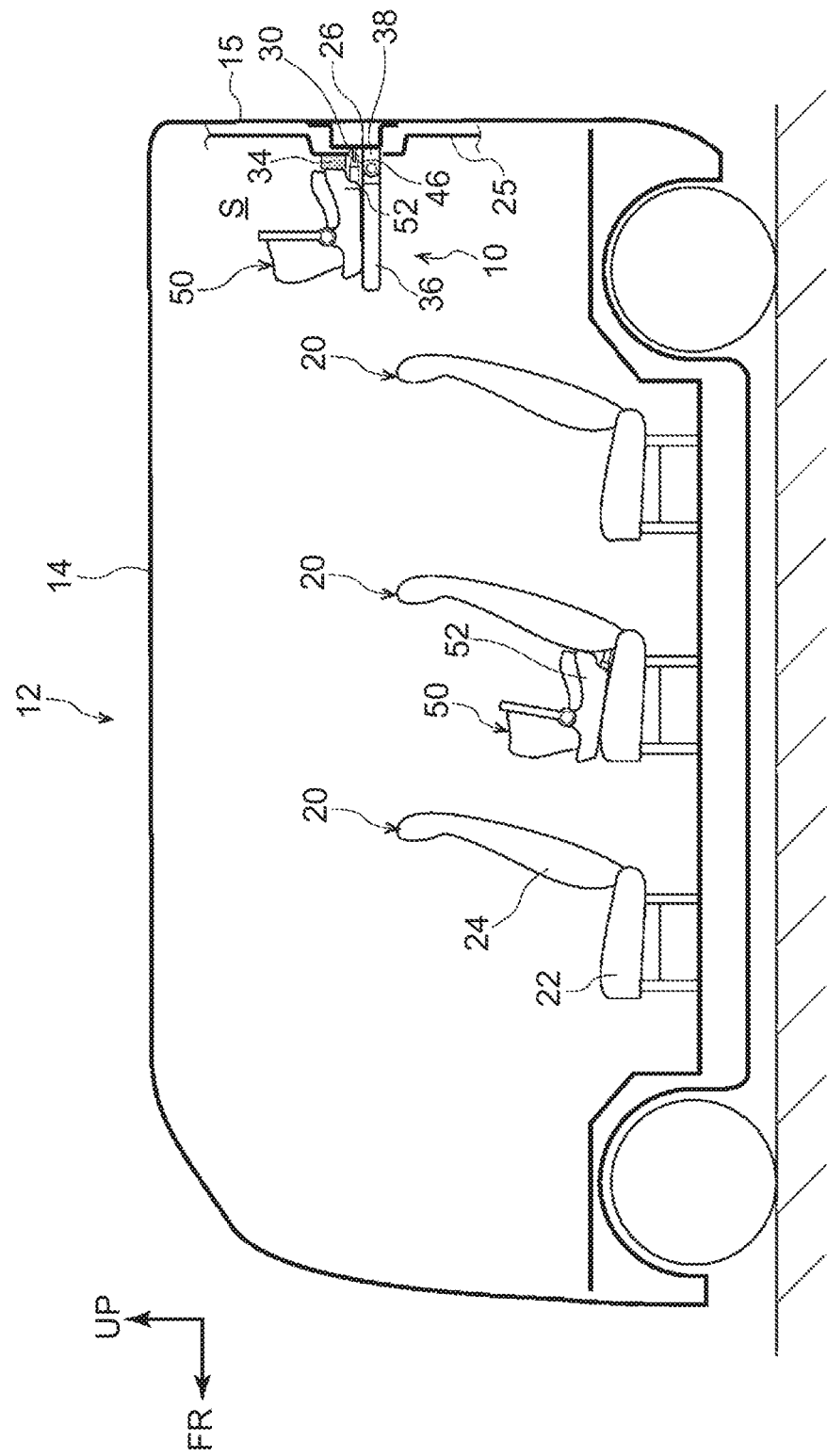
FIG. 11 is a side view showing a cabin of a bus provided with a child seat temporary holding structure according to a fifth embodiment.

As shown in FIG. 11, the fifth embodiment is different from the third embodiment only in that a child seat 50 for an infant is provided instead of the child seat 40 for a toddler, and the cushion member 34 is attached to the rear wall 25 immediately above the anchor 30.

Specifically, the child seat 50 for an infant is attached to the seat 20 to face rearward, and therefore a pair of left and right connectors 46 are configured to be able to protrude from a front end portion of a seat cushion 52 toward the front side of the seat cushion 52. Thus, the child seat 50 is placed to face rearward on the support base 36.

Therefore, the cushion member 34 is arranged at a location where the front end portion of the seat cushion 52 of the child seat 50 can be brought into contact with the cushion member 34 by a predetermined pressure. The bus 12 may always be equipped with both the child seat 40 for a toddler and the child seat 50 for an infant.

Sixth Embodiment

Next, the sixth embodiment will be described. Parts that are similar to those in the first embodiment, the third embodiment and the fourth embodiment are labelled with the same signs, and detailed descriptions (including the common functions) will be omitted as appropriate.

Figure 12:
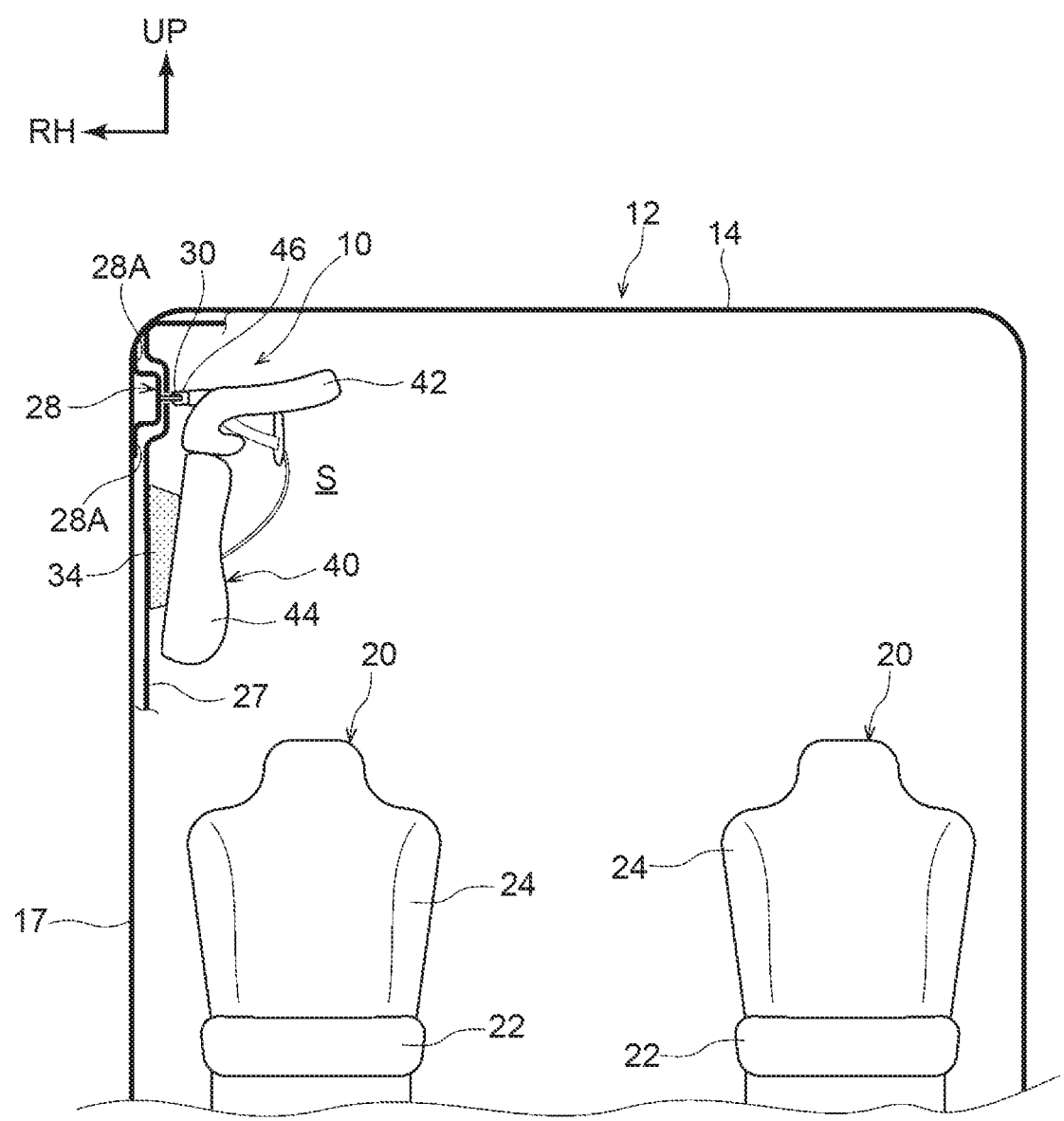
FIG. 12 is a front view showing a cabin of a bus provided with a child seat temporary holding structure according to a sixth embodiment.

As shown in FIG. 12, in the sixth embodiment, a pair of left and right anchors 30 are attached by welding or the like to a side-rail reinforcement 28 that is made of metal and provided on an upper end part of a side member outer panel 17 made of metal of the bus 12, instead of the roof reinforcement 16 provided on the roof panel 14 of the bus 12.

The side-rail reinforcement 28 extends in the front-rear direction and is formed in a substantially hat shape in a front view seen from the front-rear direction. Each of upper and lower flange parts 28A of the side-rail reinforcement 28 is joined to the inner surface of the side member outer panel 17 by welding or the like.

A central portion of each anchor 30 protrudes from a side wall 27 toward the inside of the vehicle (inward in the vehicle width direction). The cushion member 34 is attached to the side wall 27 in the cabin, on the lower side of the anchors 30. The sixth embodiment is different from the first embodiment in the above-mentioned points.

Specifically, in the sixth embodiment, the child seat 40 is stored on the side wall 27 side, adjacent to the roof headlining 18 (see FIG. 2, etc.), and a total of four child seats 40, two each on the left and the right, are stored in the cabin of the bus 12. Each child seat 40 is secured to the anchors 30 in an upside-down state in which the front surface of the seat cushion 42 faces downward and the back surface of the seat back 44 faces outward in the vehicle width direction.

Thus, it is possible to prevent the child seat 40 from protruding toward the seats 20 (the inner lower side in the front view) from the dead space S in the vicinity of the ceiling on the upper side of the seat 20 and an outer side in the vehicle width direction. Therefore, it is possible to prevent the head of a passenger sitting on the seat 20 from hitting the child seat 40, and it is possible to reduce the occasion where the passenger sitting on the seat 20 feels that the child seat 40 is bothersome.

In the sixth embodiment, the anchors 30 protrude in such a direction as to allow connection of the connectors 46 to the anchors 30 from the inner side in the vehicle width direction, and therefore even an ordinary passenger can easily and surely attach the connectors 46 to the anchors 30, and it is possible to further eliminate the concern that the child seat 40 may fall.

Instead of providing the side-rail reinforcement 28 on the side member outer panel 17, a support member made of metal (not shown) may be perpendicularly mounted on a roof side rail (not shown), and the anchors 30 may be mounted on the support member. Alternatively, the anchors 30 may be mounted on a pillar (not shown) or the like on the rear side of the bus 12. In this case, the number of child seats 40 is appropriately changed.

Reference Example

Figure 13:
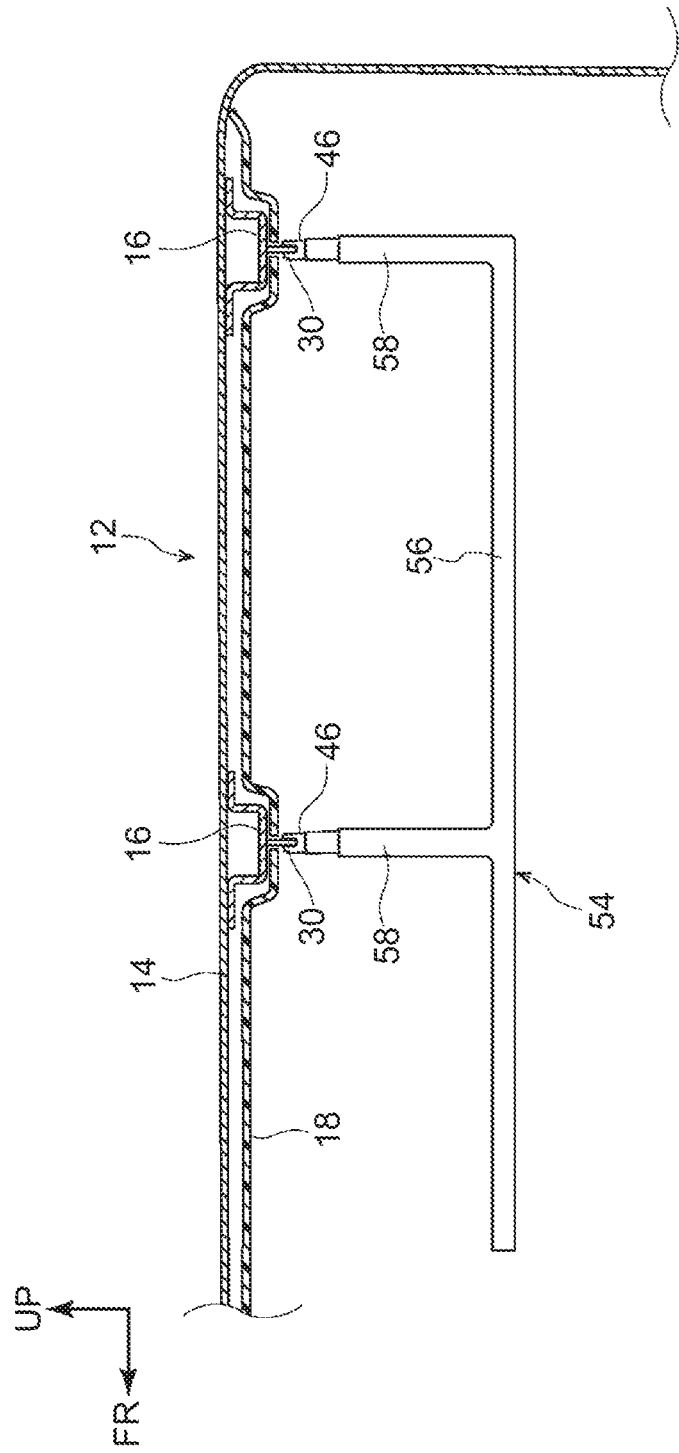
FIG. 13 is a side view showing a case where a luggage rack is attached to anchors, instead of a child seat.

Finally, a reference example will be described. When it is not necessary to always have child seats 40, 50 in the cabin of the bus 12, as shown in FIG. 13, a luggage rack 54 as a luggage storage may be attached to the anchors 30 shown in FIG. 2, instead of the child seats 40, 50.

Specifically, the luggage rack 54 has a body part 56 in the form of a substantially rectangular flat plate on which luggage is to be placed, and four cylindrical support parts 58 extending upward from the rear end portions on the left and right sides of the body part 56 and the central portion in the front-rear direction, respectively, and the connector 46 is provided at the upper end portion of each support part 58.

Hence, by attaching each connector 46 to each anchor 30, the luggage rack 54 can be secured, in a state of being suspended, to the roof reinforcement 16. By providing such a luggage rack 54, the space for placing the luggage in the cabin of the bus 12 can be increased, thereby improving the usability for passengers (excluding toddlers and infants) riding the bus 12.

The child seat temporary holding structure 10 according to the present embodiments has been described based on the drawings, but the child seat temporary holding structure 10 according to the present embodiments is not limited to those shown in the drawings, and can be appropriately modified in design within the scope not departing from the gist of the present disclosure. For example, the passenger motor vehicle is not limited to the small-size bus 12 (including a fixed-route bus or the like) driven by a staff member, and may be a large-size bus which is not capable of placing the child seats 40, 50 in a luggage compartment, or an autonomous bus with no staff member.

In the third embodiment, the fourth embodiment and the sixth embodiment, the cushion member 34 may be attached to the back surface of the seat back 44 of the child seat 40 in the same manner as in the second embodiment. Furthermore, in the sixth embodiment, instead of holding the child seat 40 in the upside-down state, the support base 36 for supporting the seat cushion 42 of the child seat 40 from below may be provided in the same manner as in the third embodiment.

What is claimed is:

1. A child seat temporary holding structure in a passenger motor vehicle having a connection member to which a connector provided on an ISOFIX type child seat is to be detachably connected, the connection member protruding from a top wall located on an upper side of a vehicle body relative to a seat in a cabin of the passenger motor vehicle, wherein the child seat is held in a downward-facing state when the connector is connected to the connection member.

2. The child seat temporary holding structure in the passenger motor vehicle according to claim 1, wherein the connection member protrudes in such a direction as to allow connection of the connector to the connection member from a lower side of the vehicle body.

3. The child seat temporary holding structure in the passenger motor vehicle according to claim 2, wherein a cushion member is provided between a seat back of the child seat and the top wall.

4. A child seat temporary holding structure in a passenger motor vehicle having a connection member to which a connector provided on an ISOFIX type child seat is to be detachably connected, the connection member protruding from a rear wall adjacent to a top wall located on an upper side of a vehicle body relative to a seat in a cabin of the passenger motor vehicle, wherein the child seat is held in an upside-down state and the connector is connected to the connection member.

5. The child seat temporary holding structure in the passenger motor vehicle according to claim 4, wherein the connection member protrudes in such a direction as to allow connection of the connector to the connection member from a front side of the vehicle body.

6. The child seat temporary holding structure in the passenger motor vehicle according to claim 5, wherein a cushion member is provided between a seat back of the child seat and the rear wall.

7. A child seat temporary holding structure in a passenger motor vehicle having a connection member to which a connector provided on an ISOFIX type child seat is to be detachably connected, the connection member protruding from a side wall adjacent to a top wall located on an upper side of a vehicle body relative to a seat in a cabin of the passenger motor vehicle, wherein the child seat is held in an inwardly-facing state in a vehicle width direction when the connector is connected to the connection member.

8. The child seat temporary holding structure in the passenger motor vehicle according to claim 7, wherein the connection member protrudes in such a direction as to allow connection of the connector to the connection member from an inner side in the vehicle width direction.

9. The child seat temporary holding structure in the passenger motor vehicle according to claim 8, wherein a cushion member is provided between a seat back of the child seat and the side wall.

10. The child seat temporary holding structure in the passenger motor vehicle according to claim 4, comprising a support base of soft material for supporting a seat cushion of the child seat from a lower side of the vehicle body.

11. The child seat temporary holding structure in the passenger motor vehicle according to claim 9, wherein the cushion member is attached to the seat back of the child seat.

12. The child seat temporary holding structure in the passenger motor vehicle according to claim 1, wherein the connection member is formed of one rod extending in a width direction of the child seat.

13. The child seat temporary holding structure in the passenger motor vehicle according to claim 3, wherein the cushion member is attached to the top wall.

14. The child seat temporary holding structure in the passenger motor vehicle according to claim 4, wherein the child seat is held in a forward-facing state when the connector is connected to the connection member.

15. The child seat temporary holding structure in the passenger motor vehicle according to claim 6, wherein the cushion member is attached to the rear wall.

16. The child seat temporary holding structure in the passenger motor vehicle according to claim 10, wherein the support base is selectively positionable between a retracted state in which the support base is pivoted upward and a deployed state in which the support base is pivoted downward.

17. The child seat temporary holding structure in the passenger motor vehicle according to claim 11, wherein the cushion member is attached to a back surface of the seat back of the child seat.

18. The child seat temporary holding structure in the passenger motor vehicle according to claim 1, wherein, when the connector is connected to the connection member, a front surface of a seat back of the child seat faces downward in an up-down direction such that a seat cushion of the child seat having a length less than a length of the seat back is positioned along the up-down direction in a side view taken from a vehicle width direction.

19. The child seat temporary holding structure in the passenger motor vehicle according to claim 4, the child seat including a seat cushion having a length shorter than a length of a seat back of the child seat, the seat cushion located on an upper side of the seat back in a side view taken from a vehicle width direction.

* * * * *